US009308699B2

(12) United States Patent
Gay et al.

(10) Patent No.: US 9,308,699 B2
(45) Date of Patent: Apr. 12, 2016

(54) MOULDING ELEMENT COMPRISING A PLURALITY OF RIBS AND AT LEAST ONE RIB-FREE MEASUREMENT ZONE

(75) Inventors: Didier Gay, Clermont-Ferrand (FR); Joseph Roche, Clermont-Ferrand (FR)

(73) Assignees: COMPAGNIE GENERALE DES ESTABLISSMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 553 days.

(21) Appl. No.: 13/700,472

(22) PCT Filed: May 31, 2011

(86) PCT No.: PCT/EP2011/058917
§ 371 (c)(1),
(2), (4) Date: Jan. 30, 2013

(87) PCT Pub. No.: WO2011/151311
PCT Pub. Date: Dec. 8, 2011

(65) Prior Publication Data
US 2013/0118660 A1 May 16, 2013

(30) Foreign Application Priority Data
May 31, 2010 (FR) ...................... 10 54229

(51) Int. Cl.
B29C 33/42 (2006.01)
B29D 30/06 (2006.01)
(Continued)

(52) U.S. Cl.
CPC .............. *B29D 30/06* (2013.01); *B29C 33/424* (2013.01); *B29D 30/0629* (2013.01);
(Continued)

(58) Field of Classification Search
CPC ................... B29D 30/0606; B29D 2030/0612; B29D 2030/0613; B29D 2030/0616; B29D 30/0629; B29C 33/42; B29C 33/424
See application file for complete search history.

(56) References Cited

U.S. PATENT DOCUMENTS 3,327,570 A    6/1967  McClarran
4,553,918 A *  11/1985 Yoda et al. ...................... 425/46
(Continued)

FOREIGN PATENT DOCUMENTS

EP    0378090 A1    7/1990
EP    1232843 A2    8/2002
(Continued)

OTHER PUBLICATIONS

International Search Report (PCT/ISA/210) issued on Sep. 21, 2011, by the European Patent Office as the International Searching Authority for International Application No. PCT/EP2011/058917.
(Continued)

*Primary Examiner* — James Mackey
(74) *Attorney, Agent, or Firm* — Dickinson Wright PLLC

(57) ABSTRACT

The invention relates to a molding element for a mold for a tire comprising a tread provided with a plurality of blocks. Each block comprises a contact surface intended to come into contact with a road surface during running. The molding element also comprises a molding surface for molding the contact surfaces of the blocks. The molding surface comprises a plurality of ribs intended to mold fine grooves in the blocks. These ribs have a height of between 0.005 and 1 mm, a width of between 0.01 mm and 0.3 mm and the pitch (P) of the ribs is between 0.1 and 2 mm. The molding surface comprises at least one rib-free measurement zone able to accept measurement means. This measurement zone has the overall shape of a disc the diameter of which is greater than 3 mm.

2 Claims, 2 Drawing Sheets

(51) Int. Cl.
　　　*B29D 30/66*　　(2006.01)
　　　*B60C 11/03*　　(2006.01)
　　　*B60C 11/12*　　(2006.01)

(52) U.S. Cl.
　　　CPC ........... *B29D 30/66* (2013.01); *B60C 11/0306* (2013.04); *B60C 11/1236* (2013.04); *B29D 2030/0612* (2013.01); *B29D 2030/0613* (2013.01); *B29D 2030/0616* (2013.01); *B60C 11/032* (2013.04); *B60C 2011/1231* (2013.04); *B60C 2011/1245* (2013.04); *B60C 2011/1277* (2013.04); *B60C 2011/1295* (2013.04)

(56) References Cited

U.S. PATENT DOCUMENTS

| | | | |
|---|---|---|---|
| 4,994,126 | A | 2/1991 | Lagnier |
| 6,533,006 | B1 * | 3/2003 | Siltanen ................ 152/209.1 |
| 7,290,996 | B2 * | 11/2007 | Tanaka .................... 425/46 |
| 8,313,679 | B2 * | 11/2012 | Guichon et al. .......... 264/219 |
| 2002/0119209 | A1 | 8/2002 | Tanaka |
| 2006/0188593 | A1 | 8/2006 | Tanaka |
| 2007/0006954 | A1 | 1/2007 | Tsubono et al. |
| 2007/0278707 | A1 | 12/2007 | Koberlein |
| 2008/0277038 | A1 | 11/2008 | Guichon et al. |
| 2010/0282387 | A1 | 11/2010 | Wenzel |

FOREIGN PATENT DOCUMENTS

| | | |
|---|---|---|
| EP | 1987932 A1 | 11/2008 |
| EP | 2085201 A1 | 8/2009 |
| GB | 1366300 A | 9/1974 |
| JP | 6-226746 A | 8/1994 |
| KR | 1020070055872 A | 5/2007 |
| SU | 408833 A1 | 11/1973 |
| WO | WO 00/29228 A1 | 5/2000 |

OTHER PUBLICATIONS

French Search Report issued Jan. 14, 2011 for French Application No. 1054229.

French Written Opinion issued Jan. 14, 2011 for French Application No. 1054229.

\* cited by examiner

MOULDING ELEMENT COMPRISING A PLURALITY OF RIBS AND AT LEAST ONE RIB-FREE MEASUREMENT ZONE

BACKGROUND OF THE INVENTION

1. Field of the Invention

The present invention relates to the field of vulcanizing moulds for tires. The invention relates notably to the moulds intended for moulding snow tires which on their tread have a large number of fine grooves.

2. Description of Related Art

Document EP0378090 discloses providing a tread of a snow tire with a plurality of sipes.

The sipes are cuts which extend into the depth of the tread and open onto the tread surface, thereby forming edge corners. These edge corners are of particular benefit in improving grip on a snowy or icy road surface.

In order to improve the grip on a snowy or icy road surface still further, document US2007/0006954 discloses also providing the tire with a great many fine grooves uniformly distributed through the tread. These fine grooves open onto the tread surface of the tread and form additional edge corners. Thus, on a snowy or icy road surface, it is both the edge corners of the sipes and the edge corners of the fine grooves which will "scrape away at" the snow or the ice.

Document US2007/0006954 also discloses a mould for moulding a tire. In general, a mould for a tire comprises several separate moulding elements which, by being brought relatively closer together, delimit a moulding space of toroidal overall shape. In order to avoid tire appearance defects of the runout type, it is necessary for the radial offset between the various moulding elements to be limited once these elements have been brought together. In order to avoid these radial offsets, care is taken to ensure perfect control over the thickness of the moulding elements. In order to achieve that, it is known practice to check the thickness of the moulding elements using a three-dimensional measurement machine. The three-dimensional measurement machine comprises a fixed support bed and a sensing probe. The checking operation is performed as follows: the moulding element is placed on the support bed then the moving sensing probe is used to sense various measurement zones on the moulding element. By sensing suitable measurement zones, it is possible to determine the thickness of the moulding element at a plurality of points. By comparing these measured thickness values against reference thickness values, it is possible to determine whether or not the moulding element is compliant.

In order to determine the thickness of the moulding element, it is necessary to probe the moulding surface of the moulding element, namely that surface of the moulding element that is to form the tread surface of the tread of the tire. Now, this moulding surface is not completely smooth because it is encumbered with ribs that form fine grooves in the tread. The presence of these ribs therefore makes it more difficult for the three-dimensional measurement machine to determine the thickness of the moulding element with accuracy.

There is therefore a need to improve the accuracy in the measuring of the thickness of a moulding element provided with a plurality of ribs intended to mould fine grooves in a tread of a tire.

SUMMARY OF THE INVENTION

The invention relates, in an embodiment, to a moulding element for a mould for a tire comprising a tread provided with a plurality of blocks. Each block of the tread comprises a contact surface intended to come into contact with a road surface during running of the tire. The moulding element comprises a moulding surface for moulding the contact surfaces of the blocks. The moulding surface comprises a plurality of ribs intended to mould fine grooves in the blocks. These ribs have a height of between 0.005 and 1 mm, a width of between 0.01 mm and 0.3 mm, and a pitch between the ribs of between 0.1 and 2 mm. The moulding surface comprises at least one rib-free measurement zone able to accept measurement means. In an embodiment, this measurement zone has the overall shape of a disc. In a particular embodiment, the diameter of this disc is greater than 3 mm.

The invention therefore consists in providing at least one specific zone on the moulding surface of the moulding element at which to take measurements using a sensing probe of a three-dimensional measurement machine. This specific zone is free of ribs and in a particular embodiment has a shape suited to the spherical shape of the sensing probe of the machine and to the diameter of this sensing probe which is between 1 mm and 2 mm. This then guarantees that it will be far easier to probe the moulding element without encountering any ribs. This then improves the accuracy with which the thickness of the moulding element is determined in this measurement zone.

In an alternative form of embodiment, the moulding element comprises two edges circumferentially delimiting the moulding surface, each of the said edges being able to come into contact with an edge of another moulding element. In a particular embodiment, the centre of the measurement zone is distant from one of the said edges by 15 mm at most.

Most of the appearance defects of the runout type are the result of a radial offset between the edges of adjacent moulding elements. By locating the measurement zone near an edge of the moulding element, it is possible to check the compliance of the thickness of the moulding element at this edge. It is therefore possible to further limit appearance defects of the runout type.

The invention also relates, in an embodiment, to a moulding element for a mould for a tire comprising a tread provided with a plurality of blocks. Each block of the tread comprises a contact surface intended to come into contact with a road surface during running of the tire. The moulding element comprises a moulding surface for moulding the contact surfaces of the blocks. In an embodiment, this moulding surface has a roughness of between 0.005 mm and 0.02 mm. The moulding surface comprises at least one measurement zone able to accept measurement means, and having a roughness less than that of the molding surface of the blocks. In a particular embodiment, the measurement zone has the overall shape of a disc. In a more particular embodiment, the diameter of the disc is greater than 3 mm, and the measurement zone exhibits a roughness of between 0.002 mm and 0.003 mm.

In another embodiment, it is possible to replace the ribs on the blocks of the tread with a special surface finish. This surface finish will create a plurality of bumps and hollows on the tread surface of the tread. These bumps and hollows will improve the grip of the tire on a snowy or icy road surface. However, the special surface finish of the moulding surface of the moulding element does not allow a three-dimensional measurement machine to measure with accuracy. By providing a measurement zone of limited dimensions that has a different surface finish than the rest of the moulding surface, the assessment of the thickness of the moulding element is improved.

Another subject of the invention is a mould comprising a moulding element as described hereinabove. Another subject of the invention relates to a snow tire moulded and vulcanized using this mould.

BRIEF DESCRIPTION OF THE DRAWINGS

Other features and advantages of the invention will emerge from the following description, given by way of nonlimiting example, with reference to the attached drawings in which.

DETAILED DESCRIPTION OF SPECIFIC EMBODIMENTS

In the description which follows, elements that are substantially identical or similar will be denoted by the same references.

Figure 1:
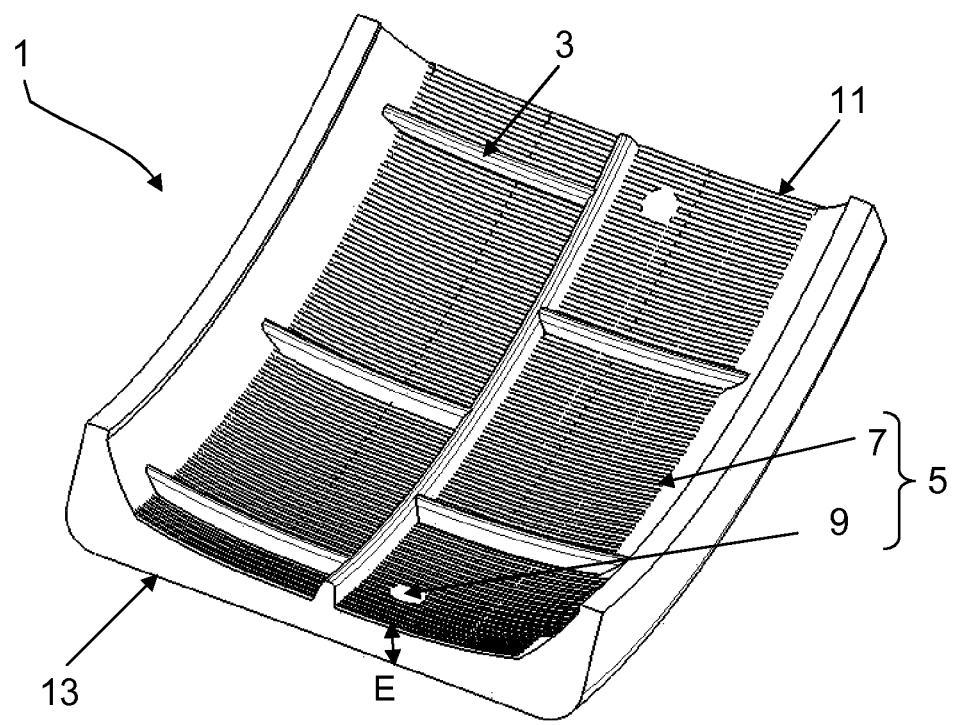
FIG. 1 is a schematic perspective view of a moulding element comprising a plurality of ribs.

FIG. 1 is a schematic perspective view of a moulding element according to a first embodiment of the invention. The moulding element comprises blades 3 and a moulding surface 5. The blades 3 are intended to mould grooves in the tread of a moulded tire. The grooves are cuts the width of which is greater than 2 mm and the height of which is greater than 4 mm. These grooves delimit blocks of rubber in the tread of the tire. The moulding surface 5 is intended to mould the contact surfaces of the blocks of the tread. The contact surface of a block is the surface that will come into contact with the road surface during running.

The moulding surface 5 here comprises a plurality of ribs 7 intended to mould fine grooves in the tread. In the illustrated embodiment, the ribs are mutually parallel and uniformly spaced. More specifically, in a particular embodiment, the pitch of the ribs (i.e., the distance between successive ribs) is between 0.1 and 2 mm.

The moulding surface 5 also comprises at least one rib-free zone 9 delimited by ribs 7. The rib-free zone is intended to accept measurement means such as a sensing probe of a three-dimensional measurement machine. In the illustrated embodiment, the rib-free zone 9 has the overall shape of a disc and in a particular embodiment, the diameter of this disc is greater than 3 mm. In order to avoid impairing the performance of the tire on a snowy or icy road surface, the surface-area of the rib-free zone is limited. For example, in a particular embodiment, the surface-area of this zone is less than 40 mm$^2$.

It will be noted that in the illustrated embodiment, the measurement zone 9 is situated near an edge 11 that circumferentially delimits the moulding element 1. More specifically, in a particular embodiment, the centre of the measurement zone 9 is situated at a distance of less than 15 mm away from this edge 11. Likewise, the distance between the centre of the zone 9 and a median plane dividing the moulding element into two parts of the same transverse width is less than 15 mm.

Finally, it will be noted that in the particular embodiment illustrated, the moulding element here is made of aluminium obtained by moulding from a plaster mould form.

Figure 2:
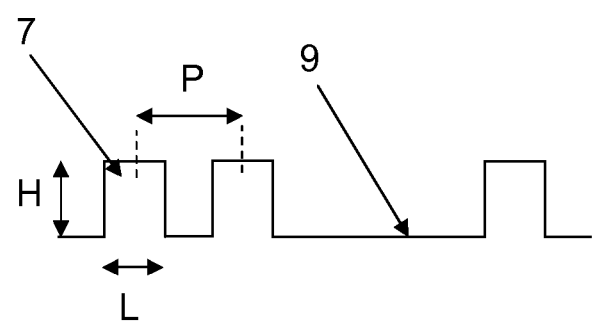
FIG. 2 is a partial cross section of the moulding surface of the moulding element of FIG. 1.

FIG. 2 is a partial cross section of the moulding surface 5 of FIG. 1. This figure more specifically shows the height H and the width L of the ribs. As can be ascertained from the drawing and the description above, the partial cross section is taken along a line passing circumferentially through the measurement zone 9. In a particular embodiment, the height H of the ribs is between 0.005 and 1 mm and the width L of the ribs is between 0.01 mm and 0.3 mm. The cross section of the ribs illustrated here is rectangular in shape. As an alternative, the cross section of the ribs may be different. For example, the cross section of the ribs may be square, triangular, sinusoidal, trapezoidal or sawtooth.

Figure 3:
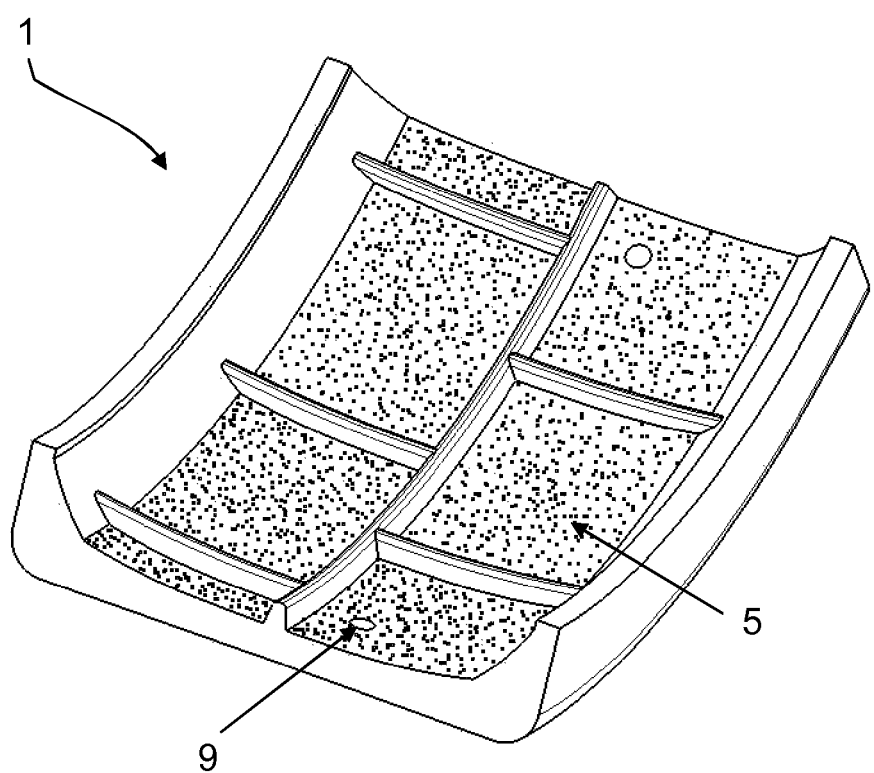
FIG. 3 is a schematic perspective view of a rib-free moulding element having a determined surface finish.

FIG. 3 is a perspective view of a moulding element 1 according to another embodiment. In this embodiment, the ribs are replaced by a particular roughness Ra. More specifically, in a particular embodiment, the moulding surface 5 exhibits a roughness Ra of between 0.005 mm and 0.02 mm. This roughness can be obtained by a special surface treatment operation, such as sandblasting.

The moulding surface 5 shown in FIG. 3 also comprises at least one measurement zone 9 intended to accept measurement means such as a sensing probe of a three-dimensional measurement machine. The measurement zone 9 has a roughness Ra lower than the rest of the moulding surface. The roughness of the measurement zone in a particular embodiment is between 0.002 mm and 0.003 mm. This roughness corresponds to the initial surface finish of the moulding element, i.e. to the surface finish of the moulding element when the latter is separated from the plaster mould form. During the operation of sandblasting the moulding surface 5, the measurement zones are protected, e.g., by steel pellets so that these measurement zones retain their low roughness.

It will be noted that the roughness measurements of the moulding surface can be performed using measurement equipment marketed under the name of "Marsurf PS1". This equipment notably meets the standards ISO 4287 and JIS B 0601.

The operation of using a three-dimensional measurement machine to check the moulding element is described herein.

In a first step, the moulding element is placed on a support bed belonging to the three-dimensional measurement machine.

In a second step, several measurements are taken on the external surface 13 of the moulding element, with reference to FIG. 1. From these measurements, the three-dimensional measurement machine is able to model this external surface 13.

In a third step, the coordinates of a point belonging to a measurement zone 9 are determined. By comparing the coordinates of this point with the model of the external surface 13, the three-dimensional measurement machine is able to calculate the thickness E of the moulding element at the measurement zone 9.

The invention is not restricted to the examples described and depicted and various modifications can be made thereto without departing from its scope.

For example, FIG. 1 depicts ribs running mainly in a transverse direction. As an alternative, the ribs could run in an oblique direction, for example making an angle of 45° with the transverse direction.

Furthermore, as another example, it is possible to provide on the moulding surface various ribbed zones with the ribs running in different directions.

Finally, as yet another example FIG. 1 depicts two rib-free measurement zones. As an alternative, the number of rib-free measurement zones may be greater than 2. It is thus possible to provide several measurement zones near one and the same edge in order to obtain a better assessment of the curvature of the moulding element at this edge.

The invention claimed is:

1. A moulding element for a mould for a tire that comprises a tread provided with a plurality of blocks, each block comprising a contact surface intended to come into contact with a road surface during running, the moulding element comprising a moulding surface for moulding the contact surfaces of the blocks, the moulding surface comprising:
   a plurality of ribs intended to mould fine grooves in the blocks, the ribs having a height (H) of between 0.005 and 1 mm, a width (L) of between 0.01 mm and 0.3 mm, and a pitch (P) between the ribs of between 0.1 and 2 mm, and
   at least one rib-free measurement zone adapted to accept a measurement probe of a three-dimensional measurement machine, wherein the measurement zone has the overall shape of a disc the diameter of which is greater than 3 mm,
wherein the moulding element further comprises two edges circumferentially delimiting the moulding surface, each of the edges adapted to come into contact with an edge of another moulding element, wherein the centre of the rib-free measurement zone is distant from one of the edges by 15 mm at most.

2. A mould for vulcanizing and moulding a tire, wherein the mould comprises at least one moulding element according to claim 1.

* * * * *